(12) United States Patent
Mikowychok

(10) Patent No.: US 10,899,664 B2
(45) Date of Patent: Jan. 26, 2021

(54) SIMULATED CONCRETE MIXTURE AND MATERIAL

(71) Applicant: Frank Mikowychok, Lincoln, CA (US)

(72) Inventor: Frank Mikowychok, Lincoln, CA (US)

( * ) Notice: Subject to any disclaimer, the term of this patent is extended or adjusted under 35 U.S.C. 154(b) by 158 days.

(21) Appl. No.: 16/273,539

(22) Filed: Feb. 12, 2019

(65) Prior Publication Data

US 2019/0248704 A1 Aug. 15, 2019

Related U.S. Application Data

(60) Provisional application No. 62/630,131, filed on Feb. 13, 2018.

(51) Int. Cl.
| | |
|---|---|
| *C04B 14/06* | (2006.01) |
| *C04B 14/10* | (2006.01) |
| *C04B 18/02* | (2006.01) |
| *C04B 40/00* | (2006.01) |
| *C04B 40/06* | (2006.01) |
| *C04B 24/04* | (2006.01) |
| *C04B 28/02* | (2006.01) |
| *C04B 103/40* | (2006.01) |
| *C04B 103/24* | (2006.01) |
| *C04B 111/00* | (2006.01) |

(52) U.S. Cl.
CPC ............. *C04B 14/06* (2013.01); *C04B 14/10* (2013.01); *C04B 18/02* (2013.01); *C04B 24/04* (2013.01); *C04B 28/02* (2013.01); *C04B 40/0039* (2013.01); *C04B 40/06* (2013.01); *C04B 2103/24* (2013.01); *C04B 2103/40* (2013.01); *C04B 2111/00991* (2013.01)

(58) Field of Classification Search
CPC ......... C04B 14/06; C04B 14/10; C04B 18/02; C04B 24/04; C04B 24/085; C04B 28/02; C04B 40/0039; C04B 40/06; C04B 2103/24; C04B 2103/40; C04B 2111/00991

See application file for complete search history.

(56) References Cited

U.S. PATENT DOCUMENTS 8,007,586 B2 * 8/2011 Elsaesser .............. C04B 28/001
106/811

FOREIGN PATENT DOCUMENTS

JP 57183340 A * 11/1982

* cited by examiner

*Primary Examiner* — Anthony J Green
(74) *Attorney, Agent, or Firm* — Whitley Legal Group, P.C.; AnnMarie W. Whitley

(57) ABSTRACT

A simulated concrete mixture combines aggregate, sand, mortar clay, and additive. The mixture is hydrated with enough water or a hydrating solution to create a simulated concrete material having a desired slump. Useful aggregates include any type of aggregate used as a base for concretes, and useful additives include soaps, detergents, surfactants, and flocculants. The material can be refreshed with water or a refresher solution. The hydrating solution and refreshing solution are solution of water and additive. The simulated concrete material can be manipulated until its consistency becomes unworkable, after which it can be refreshed with water or refresher solution.

19 Claims, 5 Drawing Sheets

SIMULATED CONCRETE MIXTURE AND MATERIAL

CROSS-REFERENCE TO RELATED APPLICATIONS

This application claims the benefit of provisional U.S. Application 62/630,131 filed Feb. 13, 2018.

FIELD OF THE INVENTION

The present invention relates to novel and useful non-setting simulated concrete mixtures and materials and related methods of use.

BACKGROUND OF THE INVENTION

Concrete, typically a mixture of paste and aggregates, is among the most widely used materials on Earth. Its durability, strength, and relatively low cost make it the backbone of buildings and infrastructure worldwide. Concrete is used to build houses, schools, and hospitals as well as airports, bridges, highways, and rail systems. It is also used to create decorative projects, unique flooring, and modern countertops. As developing nations become more urban, extreme weather events necessitate the use of durable building materials, and the cost of other infrastructure materials continue to rise, it is likely that the use of concrete will become even more prevalent.

Concrete is a unique and versatile material that is plastic and malleable when newly mixed yet strong and durable when hardened. Because of these traits, the use of concrete has spurred innovation among both concrete manufacturers and those who work with it. For example, there is a growing industry centered on concrete finishing tools that provide a particular finished surface to a freshly poured concrete mass. Some of these tools include floats, jointers, and screeds, which are pushed back and forth across the surface of freshly poured concrete before the concrete mass cures or dries. In many cases, the operator also adds a vibratory action to the concrete finishing tool that aids in the creation of a surface characteristic such as a smooth surface and, in the case of a jointer, possesses a groove to control cracking of the finish concrete slab.

For those developing tools designed to smooth, groove, stamp, or otherwise work the concrete before it hardens, it is important to test the tools during development and manufacture. For those using the tools, it is important to practice with them to refine one's technique, speed, and accuracy. Unfortunately, because concrete eventually hardens, developers and operators have limited time for testing and practicing before they have to poor additional concrete. Moreover, after the concrete sets, they are left with unwanted hardened concrete that must be broken up and recycled or otherwise disposed of.

Because concrete is very useful and because many who work with concrete would like to test its limits without repeatedly creating unnecessary hardened concrete areas, it would be desirable to provide a material that simulates concrete in its plastic and malleable phase but does not permanently harden. Additionally, it would desirable to provide a simulated concrete material that can be easily altered to have different degrees of plasticity and malleability. Such a material would be a notable advance in the construction arts.

SUMMARY OF THE INVENTION

In accordance with the present invention a novel and useful simulated concrete mixture and simulated concrete material and a new method for use and reuse of the simulated concrete material is provided. The simulated concrete mixture is formed by combining aggregate, sand, mortar, additive, and optionally water. The simulated concrete material is formed by combining the mixture ingredients with water or a hydrating solution. Aggregates useful for the concrete mixture include rock aggregate, crushed aggregate fines, porcelain aggregates, and any other type of material used as a base for concretes, and additives useful for the concrete mixture include soaps, detergents, surfactants, and flocculants. The hydrating solution and an optional refreshing solution are water solutions enhanced by adding a soap, detergent, or the additive used for the simulated concrete mixture.

To make and use the simulated concrete material, enough water is combined with the components of the simulated concrete mixture to produce a material with a desired slump. The material is formed at the working area, or it is introduced to the working area after it is formed. Once in the working area, the material can be worked or manipulated as desired. If the material become hardened on its surface or too thick, sticky, or tacky, then refresher solution or water can be sprayed on or otherwise introduced to the surface of the material in the working area.

The features and advantages of the present invention will be readily apparent to those skilled in the art upon a reading of the description of the exemplary embodiments, which follows.

For a better understanding of the invention reference is made to the following detailed description of the preferred embodiments of the invention which should be taken in conjunction with the above described drawings.

DETAILED DESCRIPTION OF THE INVENTION

Figure 1:
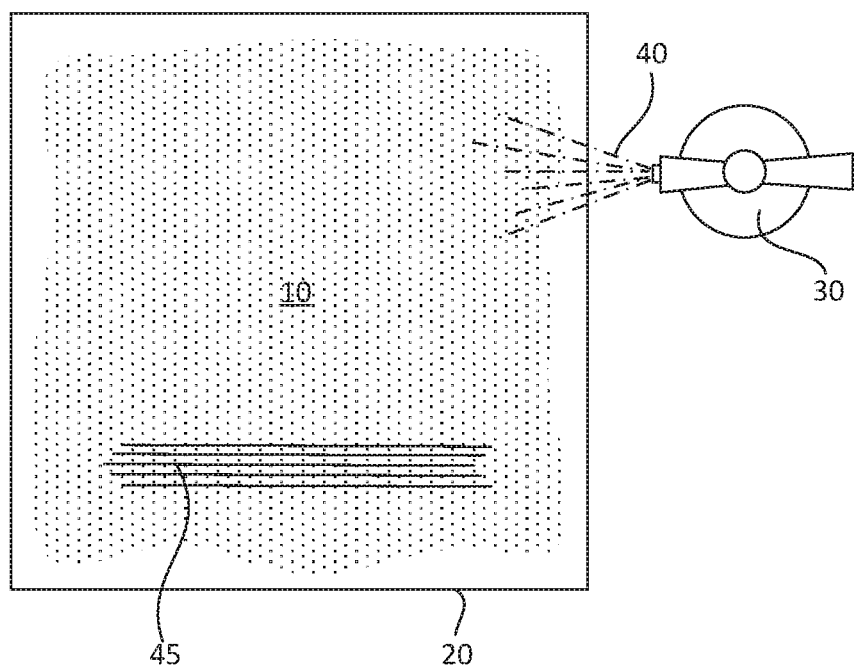
FIG. 1 is a top view of an embodiment of the simulated concrete material applied to a working area in accordance with the present invention.

The present invention relates to a novel and useful non-setting simulated concrete material and related methods of use and manufacture. FIG. 1 illustrates a working area 20 of the simulated concrete material 10, which generally comprises aggregate 13, sand 14, mortar 16, additive 15, and water 17.

Figure 2:
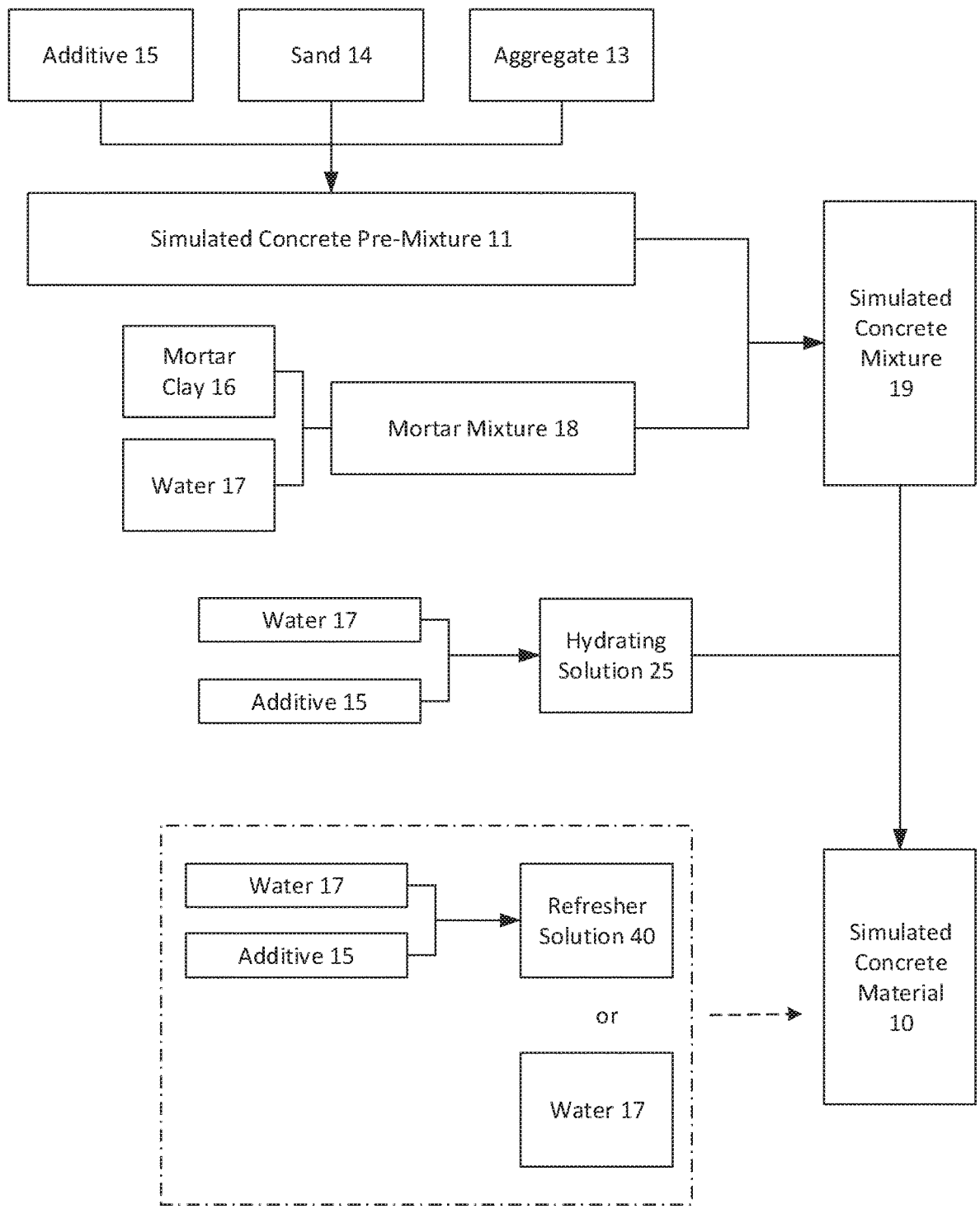
FIG. 2 is a chart illustrating the components and steps to make a first embodiment of the simulated concrete material of the present invention.
Figure 3:
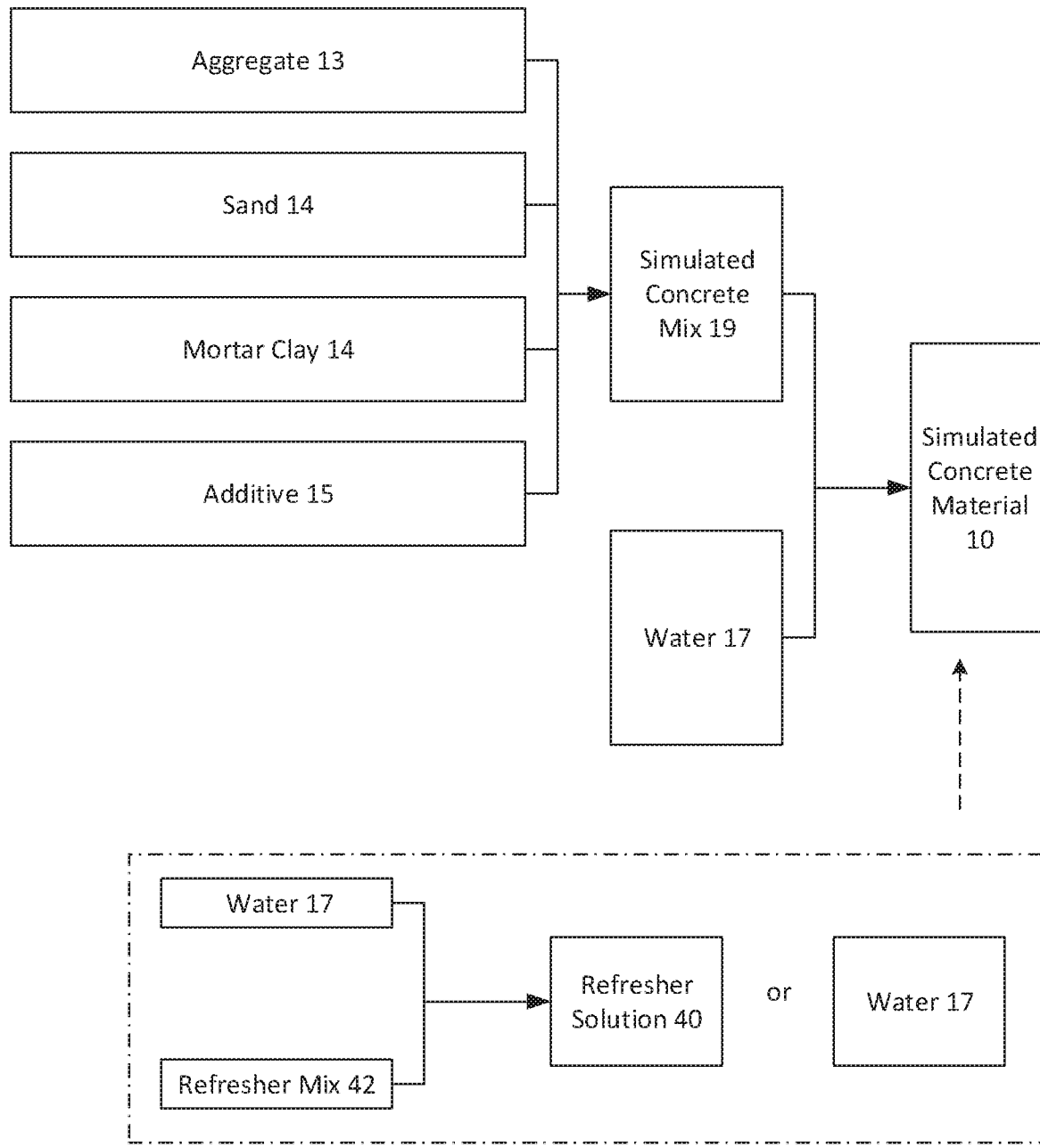
FIG. 3 is a flow illustration the components and steps to make a second embodiment of the simulated concrete material of the present invention.
Figure 4:
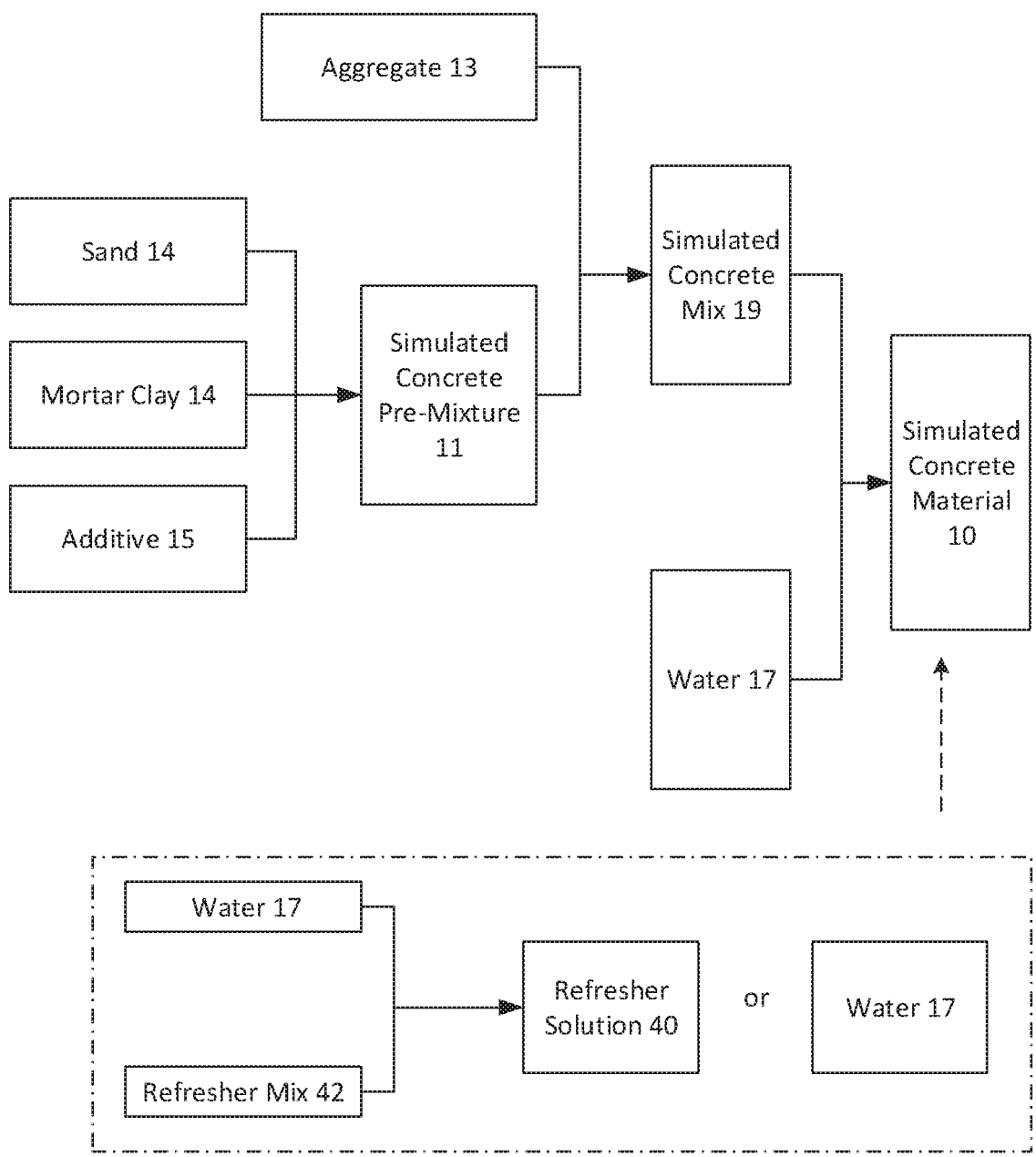
FIG. 4 is a flow illustration the components and steps to make a third embodiment of the simulated concrete material of the present invention.

FIGS. 2-4 illustrate embodiments of the simulated concrete mixture 19 and simulated concrete material 10 of the present invention. Generally, in one embodiment, the simulated concrete mixture 19 includes at least aggregate 13, sand 14, and additive 15. Optionally, the simulated concrete mixture 19 also includes mortar clay 16. Alternatively, mortar clay 16 is combined with water 17 to create a mortar mixture 18 that can be mixed with a simulated concrete pre-mixture 11. Generally, in another embodiment, the simulated concrete mixture 19 includes at least sand 14, additive 15, and mortar clay 16, and allows for separately adding aggregate 13 so that the type of aggregate may be selected according to the type of simulated concrete material desired.

Aggregate 13 useful for the present invention preferably comprises coarse and fine aggregates such as 1 inch minus rock aggregate, ⅜ pea gravel aggregate, ¾ rock aggregate, and crushed fines aggregate. Type 2 aggregate or other types of aggregate or base for concrete may be used, however, depending on the user's needs. Additional types of aggregate are known to those skilled in the art and include, for example, gravel, limestone, granite, scrabbled stone, glass, porcelain, recycled material, and construction site waste. If a user wishes to simulate concrete that includes pebbles or porcelain in addition to or instead of the rock, then the appropriate aggregate or similar base can be substituted. The preferred sand 14 to be used with the present invention is a medium course sand, but can be any type of concrete sand, mortar sand, or white sand. A preferred commercially available aggregate and sand mixture useful for this invention is ConMix 1 inch minus aggregate and sand mixture from CONMIX LTD of United Arab Emirates. The preferred mortar clay 16 to be used with the present invention is mortar clay from H.C. Muddox of Sacramento, Calif., but any type of mortar clay may be used, including any refined and/or sifted earth material without any cementations properties. Additionally, the water 17 used for the present invention is preferably a drinkable natural water without pronounced taste or odor, but any water may be used.

The additive 15 useful for the present invention includes soaps, detergents, surfactants such as sodium cocoyl isethionate, and flocculants such as water soluble, high molecular weight anionic polymers. For purposes of the present invention, additive 15 can be made from natural ingredients or synthetic derivatives. Additionally, any general reference to soap or detergent herein shall be construed as meaning soap and/or detergent, and any such soap or detergent can be a single ingredient product, such as a surfactant. Additive 15 may also include a combination of additives such as a detergent or surfactant combined with a flocculant.

Preferably, additive 15 is a dry soap or detergent. Additionally, additive 15 preferably includes at least a surfactant and optionally an alkaline builder salt. Alternatively or additionally, additive 15 may also include a flocculant. For the present invention, preferable surfactants include, for example, nonionic surfactants such as alcohol ethoxylates and anionic surfactants such as linear alkylbenzene sulfonate, alcohol ethoxysulfates, and alkyl sulfates. Cationic and amphoteric surfactants may also be used. A preferred surfactant for the present invention is sodium cocoyl isethionate (SCI), and alternatives also include sodium lauryl sulfoacetate, sodium lauryl sulfate, cocamidopropyl betain or cocobetaine, decyl glucoside, coco glucoside, PEG 40 castor oil, dodecylbenzene sulfonate, ethoxylated lauryl alcohol, and sodium xylenesulfonate. Alkaline builder salts include, for example, ammonium hydroxide, ethanolamine, sodium carbonate, sodium hydroxide, sodium borate, and sodium silicate. Additionally, other builders may be used such as chelators, which include citric acid, gluconic acid, and ethylenediaminetetraacetic acid, or ion exchange agents, which include zeolites. A preferred flocculant is a water soluble, high molecular weight anionic polymer or a polymer product such as INSTA-VIS DRY from CETCO of New York, N.Y.

Additional compounds also may be present in additive 15, including in any soap or detergent, for use with the present invention. Additional compounds include, for example, water softener agents, suds suppressors, builder, pH adjusters, defoamers, brightening agents, fragrances, solvents, processing aids, hydrotropes, preservatives, enzymes, corrosion inhibitors, and antiredeposition agents. Such compounds are commonly known to those skilled in the arts. An example of a commercially available soap useful for the present invention is Gain® dry laundry detergent from Procter & Gamble of Cincinnati, Ohio. Another commercially available soap useful for the present invention is All® Free & Clear dry laundry detergent from Sun Products of Wilton, Conn. While not required, some operators may prefer to use simulated concrete material that is made using an unscented soap or detergent.

FIG. 2 illustrates one embodiment of the components of and steps for making the simulated concrete mixture 19 and material 10. As shown, a dry simulated concrete pre-mixture 11 is formed by combining aggregate 13, sand 14, and additive 15. Preferably, for each 4-6 parts of aggregate 13, 1-2 parts of sand 14 is added along with and 1 part additive 15. For the embodiment shown in FIG. 2, additive 15 comprises a commercially available dry laundry detergent. Then, separately from preparing the first dry simulated concrete mixture 12, a mortar mixture 12 is formed by combining dry mortar clay 16 and water 17. Preferably, relative to aggregate 13, 1-2 parts of the dry mortar clay 16 is mixed with 1-2 parts water 17 to form the mortar mixture 18. More preferably, enough water 17 should be combined with mortar clay 16 so that the resultant mortar mixture 18 has a consistency similar to that of traditional pancake batter.

After separately preparing the mortar mixture 18 and simulated concrete pre-mixture 11, as shown by FIG. 2, the mortar mixture 18 is added to the simulated concrete pre-mixture 11 to make the simulated concrete mixture 19. Then, to make the final simulated concrete material 10, the simulated concrete mixture 19 is further hydrated with water 17 or, more preferably, with a hydrating solution 25 comprising 10 parts water and 0.01 to 1.25 parts additive 15. For example, hydrating solution 25 may comprise 2 cups of detergent for each gallon of water. The exact amount of water 17 or hydrating solution 25 to be used for hydrating the first simulated concrete mixture 19 will depend on the amount of slump desired for the material 10 and project. To achieve the desired slump, according to the present invention, water 17 or solution 25 is gradually introduced to hydrate the mixture 19. Preferably, after further hydrating, the water-mortar ratio is similar to a traditional water-cement ratio of between 0.35 and 0.60. Preferably, the water-mortar ratio is between 0.45 and 0.50.

FIG. 3 illustrates a second and preferred embodiment of the present invention where the simulated concrete mixture 19 is a dry mixture and includes aggregate 13, sand 14, additive 15, and mortar clay 16. Preferably, simulated concrete mix 19 is formed by combining the dry ingredients as follows: 100 parts aggregate 13, 66 parts sand 14, 50 parts mortar clay 16, and 0.02 to 10 parts of additive 15, depending on the concentration of additive 15. Then, to transform the dry simulated concrete mixture 19 into simulated concrete material 10, water is added until the desired slump is achieved. Examples of the embodiment shown in FIG. 3 are below.

EXAMPLE 1

To prepare a working area of approximately 2 foot wide by 2 foot long by 2½ inches thick, first either a commercially available concrete mixture such as ConMix from CONMIX LTD of the United Arab Emirates is provided or approximately 2 gallons of sand and 3 gallons of aggregate of aggregate are combined. Next, 32 ounces or 4 cups of dry detergent such as All® Free & Clear is distributed throughout the sand and aggregate mixture. After the 4 cups of dry detergent is evenly distributed, 1.5 gallons of mortar clay is mixed throughout the detergent, sand, and gravel mixture to create the dry simulated concrete mixture. Then, to create the simulated concrete material, water is added until the desired slump is achieved.

EXAMPLE 2

To prepare a working area of approximately 2 foot wide by 2 foot long by 2½ inches thick, first either a commercially available concrete mixture such as ConMix from CONMIX LTD of the United Arab Emirates is provided or approximately 2 gallons of sand and 3 gallons of aggregate are combined. Next, 8 ounces or 1 cup of dry granulated sodium cocoyl isethionate (SCI) is distributed throughout the sand and aggregate mixture. After the 1 cup of SCI is evenly distributed, 1.5 gallons of mortar clay is mixed throughout the SCI, sand, and gravel mixture to create the dry simulated concrete mixture. Then, to create the simulated concrete material, water is added until the desired slump is achieved.

EXAMPLE 3

To prepare a working area of approximately 2 foot wide by 2 foot long by 2½ inches thick, first either a commercially available concrete mixture such as ConMix from CONMIX LTD of the United Arab Emirates is provided or approximately 2 gallons of sand and 3 gallons of aggregate are combined. Next, 32 ounces or 4 cups of dry detergent such as All® Free & Clear and 1 teaspoon of a dry INSTA-VIS DRY anionic polymer are distributed throughout the sand and aggregate mixture. After the detergent and anionic polymer is evenly distributed, 1.5 gallons of mortar clay is mixed throughout the anionic polymer, sand, and gravel mixture to create the dry simulated concrete mixture. Then, to create the simulated concrete material, water is added until the desired slump is achieved.

A third embodiment of the present invention is shown in FIG. 4. This embodiment is identical to the third embodiment, including the relative proportions of each component, but it provides for a simulated concrete pre-mixture 11 of only sand 14, additive 15, and mortar clay 16. To prepare the simulated concrete mix 19, the pre-mixture 11 is combined with aggregate 13. Then, to prepare the material 10, the simulated concrete mixture 19 is combined and water 17. By adding the aggregate 13 after preparing the pre-mixture 11, the type aggregate 13 used can be changed. For example, if an operator wanted to practice with simulated concrete having a traditional composition, it might choose aggregate comprised of ¾ aggregate and crushed fines. Alternatively, if an operator wanted to practice with a pebble or porcelain type of concrete, it might choose aggregated comprised at least partly of pebbles or porcelain. A fourth embodiment is similar to the third embodiment except the pre-mixture includes only mortar clay 16 and additive 15. The pre-mixture can then be combined with any combination of sand 14 and aggregate 13 as needed to create the simulated concrete mixture 19 and then hydrated to create the simulated concrete material 10.

While ratios of materials such as sand 14, aggregate 13, additive 15, mortar clay 16, and water 17 are provided in the description and examples herein, the proportions may be altered depending on the properties of simulated concrete desired. Additionally, the amounts of the materials can be modified without significantly impacting the resultant simulated concrete material. For example, for each 10 parts aggregate 13, the amount of sand 14 used may range between 1.5 and 7 parts. Additionally for 10 parts aggregate 13, the amount of mortar clay 16 and additive 15 may range between 1 and 5 parts mortar clay 16 and 0.02 and 2 parts additive 15.

After the mixture of base 13, sand 14, additive 15, water 17, and mortar 16 is fully hydrated with additional water 17 or solution 25, the resulting material 10 acts like concrete but does not permanently harden like concrete. If the material 10 becomes too sticky as water evaporates or it hardens or appears hardened, it can be rehydrated or refreshed with water 17 or a refresher solution 40. The refresher solution 40 may comprise water 17 only or, more preferably, may comprise water 17 combined with refresher mix 42, where refresher mix 42 is the same additive 15 as used in the original simulated concrete mix. Alternatively, a different soap may be used provided it contains similar properties to the soap used in the simulated concrete mix. Refresher mix 42 preferably is a dry granular surfactant without additional ingredients. To make the refresher solution of refresher mix 42 and water 17, preferably the refresher mix 42 and water 17 are combined such that there is about ½-2 cups of refresher mix 42 per gallon of water, as shown in FIGS. 2-4. While a ½-2 to 16 ratio of refresher mix 42 to water 17 is recommended, the amount of refresher mix 42 needed will depend on the concentration of surfactant in the refresher mix 42. For some applications, the amount of refresher mix 42 needed may be about ½-1 teaspoon. The preferred refresher solution 40 has a ratio of 10 parts water to 0-1.5 parts additive 15.

Figure 5:
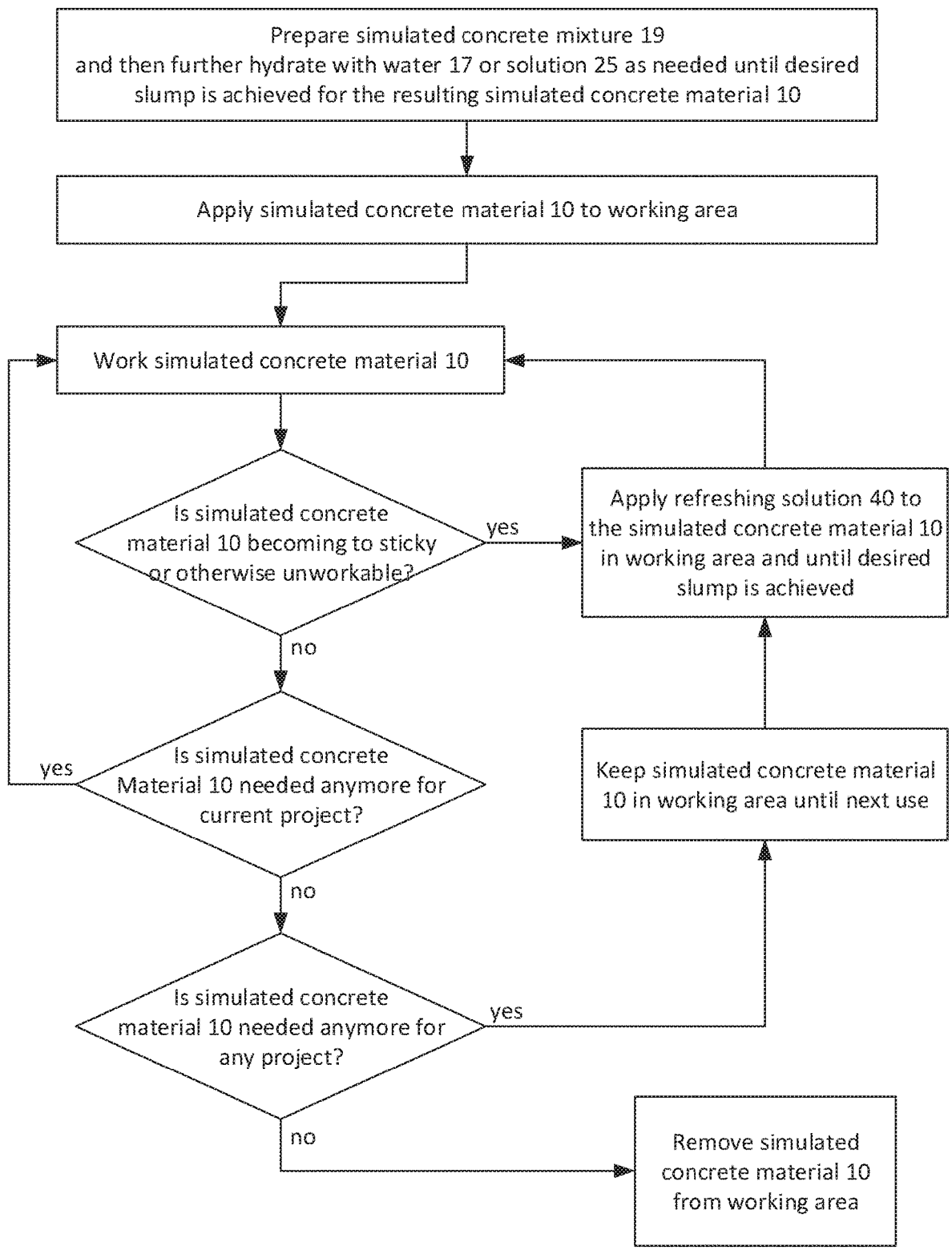
FIG. 5 is a flowchart illustrating an embodiment of the steps utilizing the method of the present invention.

An illustration and example of the method of the present invention is also shown in FIGS. 1 and 5 and comprises first preparing the simulated concrete mixture 19 according to one of the methods described above and then further hydrating the simulated concrete mixture 19 with water 17 or solution 25 as needed until the desired slump is achieved for the resulting simulated concrete material 10. The material 10 may be prepared directly in working area 20 or prepared elsewhere and then applied to or placed in a working area 20. After the material 10 is applied to the working area 20, then an operator can manipulate or work the simulated concrete material 10 as desired. If the simulated concrete material 10 becomes too sticky, tacky, or hard such that workability is decreased, then additional water 17 or the refresher solution 40 may be applied. Preferably, the water 17 or refresher solution 40 is applied with a pump sprayer 30, but any sprayer or water delivery apparatus may be used. Alternatively, water 17 or refresher solution 40 may be applied to grooves made in the surface of the material 10 by pouring or directing it to the grooves or entire surface. FIG. 1 illustrates grooves 45, which can be made with any tool including, for example, a rake. Any method of agitating the surface may be used, however. After applying the water 17 or refresher solution 40, preferably to the surface of the working area 20, the simulated concrete material 10 can again be worked as desired. As needed, water 17 or the refresher solution 40 may be repeatedly applied during the life of the simulated concrete material 10 in the working area 20. The simulated concrete material 10 can remain in the working area 20 between projects and rehydrated or refreshed when needed with water 17 or the refresher solution 40. Once the simulated concrete material 10 is no longer needed, it can then be removed from the working area 20.

It is anticipated that the simulated concrete material can be applied in a working area and continually used for many months or possibly indefinitely. By providing such material that can simply be refreshed or rehydrated with water or a refresher solution, concrete finishers can test and train their skills repeatedly without having to remove and replace demo pads. Similarly, individuals and companies developing finishing or stamping tools can use the simulated concrete material to test their tools and further refine them. It is anticipated that there are numerous applications where providing non-setting simulated concrete will enhance the development of new tools, uses, and finishing skills.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

I claim:

1. A composition for preparing simulated concrete comprising in relative parts by volume:
   10 parts by volume aggregate;
   1.5 to 7 parts by volume sand;
   1 to 5 parts mortar clay; and
   0.02 to 2 parts additive, wherein the additive comprises a detergent.

2. The composition of claim 1 wherein the additive further comprises a flocculant and wherein the additive comprises by volume: 10 parts detergent and 0.015 to 0.040 parts flocculant.

3. The composition of claim 1 comprising in relative parts by volume:
   10 parts by volume aggregate;
   1.5 to 7 parts by volume sand;
   1 to 5 parts mortar clay; and
   0.75 to 1 parts detergent.

4. The composition of claim 2 comprising in relative parts by volume:
   10 parts by volume aggregate;
   1.5 to 7 parts by volume sand;
   1 to 5 parts mortar clay; and
   0.75 to 1 parts detergent; and
   0.002 to 0.004 parts flocculant.

5. The composition of claim 1 wherein the aggregate is selected from the group of: 1 inch minus rock, ⅜ inch pea gravel, and ¾ inch crushed rock.

6. A composition for preparing simulated concrete comprising in relative parts by volume:
   10 parts by volume aggregate;
   1.5 to 7 parts by volume sand;
   1 to 5 parts mortar clay; and
   0.02 to 2 parts additive, wherein the additive comprises a surfactant.

7. The composition of claim 6 wherein the additive further comprises a flocculant and wherein the additive comprises by volume: 1 part surfactant and 0.050 to 0.200 parts flocculant.

8. The composition of claim 6 comprising in relative parts by volume:
   10 parts by volume aggregate;
   1.5 to 7 parts by volume sand;
   1 to 5 parts mortar clay; and
   0.1 to 0.3 parts surfactant.

9. The composition of claim 7 comprising in relative parts by volume:
   10 parts by volume aggregate;
   1.5 to 7 parts by volume sand;
   1 to 5 parts mortar clay;
   0.1 to 0.3 parts surfactant; and
   0.002 to 0.004 parts flocculant.

10. The composition of claim 6 wherein the surfactant comprises sodium cocoyl isethionate.

11. A method of preparing simulated concrete material comprising:
   a. providing a composition for preparing simulated concrete wherein
      the composition comprises in relative parts by volume:
         10 parts by volume aggregate;
         1.5 to 7 parts by volume sand;
         1 to 5 parts mortar clay; and
         0.02 to 2 parts additive;
   b. adding hydration solution to the composition until a workable simulated concrete material is achieved.

12. The method of claim 11 wherein the hydration solution comprises water.

13. The method of claim 11 wherein the hydration solution comprises in relative parts by volume: 10 parts water and 0.01 to 1.25 parts additive.

14. The method of claim 11 further comprising applying additional hydration solution after hardening of the material.

15. A method of using simulated concrete material comprising:
   a. providing a composition for preparing simulated concrete wherein the composition comprises in relative parts by volume:
         10 parts by volume aggregate;
         1.5 to 7 parts by volume sand;
         1 to 5 parts mortar clay; and
         0.02 to 2 parts additive;
   b. adding hydration solution to the composition until a workable simulated concrete material is achieved;
   c. filling a work area with the simulated concrete material;
   d. working the simulated concrete material until it hardens or becomes unworkable;
   e. applying a refreshing solution to an exposed surface of the simulated concrete material in the work area until the simulated concrete material becomes workable; and
   f. continuing to alternately work the simulated concrete material and apply additional refreshing solution when needed to improve workability of the simulated concrete material.

16. The method of claim 15 wherein the refreshing solution comprises water.

17. The method of claim 15 wherein the refreshing solution comprises in relative parts by volume: 10 parts water and 0.01 to 1.25 parts additive.

18. The method of claim 15 wherein the refreshing solution comprises the hydration solution.

19. The method of claim 15 further comprising agitating the exposed surface of the simulated concrete material after it hardens or becomes unworkable and before applying the refreshing solution.

* * * * *